US007404567B2

(12) United States Patent
Møller

(10) Patent No.: US 7,404,567 B2
(45) Date of Patent: Jul. 29, 2008

(54) ACTIVE WHEELCHAIR

(75) Inventor: Flemming Møller, Horsens (DK)

(73) Assignee: R82 A/S, Gedved (DK)

( * ) Notice: Subject to any disclaimer, the term of this patent is extended or adjusted under 35 U.S.C. 154(b) by 393 days.

(21) Appl. No.: 10/549,924

(22) PCT Filed: Mar. 22, 2004

(86) PCT No.: PCT/DK2004/000196

§ 371 (c)(1),
(2), (4) Date: Jan. 5, 2006

(87) PCT Pub. No.: WO2004/082548

PCT Pub. Date: Sep. 30, 2004

(65) Prior Publication Data

US 2006/0181051 A1 Aug. 17, 2006

(30) Foreign Application Priority Data

Mar. 20, 2003 (DK) .............................. 2003 00421

(51) Int. Cl.
*B62M 1/14* (2006.01)

(52) U.S. Cl. .................................................. 280/250.1

(58) Field of Classification Search ............... 280/250.1
See application file for complete search history.

(56) References Cited

U.S. PATENT DOCUMENTS 3,937,490 A * 2/1976 Nasr ....................... 280/250.1
4,310,167 A 1/1982 McLaurin
4,360,213 A * 11/1982 Rudwick et al. ......... 280/250.1
4,730,842 A * 3/1988 Summers et al. ............ 280/638
4,813,693 A * 3/1989 Lockard et al. ............... 280/42
4,989,890 A * 2/1991 Lockard et al. ............... 280/42
5,020,618 A 6/1991 Nagao
5,154,438 A 10/1992 Barclay
5,297,021 A * 3/1994 Koerlin et al. ................ 700/56
5,320,373 A 6/1994 Robertson et al.
5,782,483 A 7/1998 Rogers et al.
5,943,734 A 8/1999 Pearce
5,984,418 A * 11/1999 McInturff ............. 297/440.24
6,161,856 A 12/2000 Peterson
6,352,307 B1 * 3/2002 Engman ............... 297/284.11
6,467,788 B1 10/2002 Li et al.

FOREIGN PATENT DOCUMENTS

| | | |
|---|---|---|
| EP | 0329002 | 8/1989 |
| EP | 0512650 | 11/1992 |
| EP | 0841052 | 5/1998 |
| EP | 0885605 | 12/1998 |
| EP | 0945114 | 9/1999 |
| GB | 2171898 | 9/1986 |
| WO | WO 91/17077 | 11/1991 |
| WO | WO 93/00060 | 1/1993 |

* cited by examiner

*Primary Examiner*—Lesley D. Morris
*Assistant Examiner*—Michael Stabley
(74) *Attorney, Agent, or Firm*—James Creighton Wray; Clifford D. Hyra

(57) ABSTRACT

The present invention relates to the art of personal mobility vehicles, particularly vehicles for the physically impaired. Particular application is found in children's wheelchairs which grow and expand with the child. However, it is to be appreciated that the present invention may also be applicable to wheelchairs for adults and may be utilized to custom fit wheelchairs to adults, may enable the chair to be utilized by adults or children of different sizes, or may be applicable to other vehicles.

6 Claims, 6 Drawing Sheets

ACTIVE WHEELCHAIR

This application claims the benefit of Danish Application No. PA 2003 00421 filed Mar. 20, 2003 and PCT/DK2004/000196 FILED Mar. 22, 2004, which are hereby incorporated by reference in their entirety.

BACKGROUND OF THE INVENTION

The present invention relates to the art of personal mobility vehicles, particularly vehicles for the physically impaired. Particular application is found in children's wheelchairs which will have to be adaptable as the child grows. However, it is to be appreciated that the present invention may also be applicable to wheelchairs for adults and may be utilized to custom fit wheelchairs to adults, may enable the chair to be utilized by adults or children of different sizes, or may be applicable to other vehicles.

Hitherto, wheelchairs have been manufactured in various sizes to accommodate children as they grow. Manufacturing children's chairs in only fixed sizes requires frequent replacement of the entire chair and a large financial burden on parents. Accordingly, children's chairs have commonly been constructed to accommodate size alterations, thus enabling the child to use the chair over a wider range of physiological development.

In one solution, seats of different sizes have been selectively mounted on a conventional, fill size wheelchair frame. However, because the child's seat tended to be much shorter than a conventional frame, the frame extended forward significantly passed the child's feet. This excessive forward extension created difficulty in manoeuvring the chair and pulling up to tables and desks.

From EP 08885605 (Invacare) is a wheelchair suggested where the adjustments are carried out by adjusting the features such as the wheel bearings along rails provided in a sub frame. The sub frame together with the rails for adjusting the wheel base and wheel distance are provided as steel profiles which after adjustment must be refastened by means of bolts. Furthermore, a quite substantial number of parts needs to be adjusted in order to alter/adjust the size of the wheelchair which in turn allows for the occurrence of mistakes or other defaults.

Yet another adjustable wheelchair is suggested in U.S. Pat. No. 5,320,373 (Robertson et al.) wherein two substantially rigged side frames are provided in order to fasten the front and rear wheels in either side. The distance between the wheels in the driving direction of the wheelchair is not adjustable. The point of gravity may be adjusted by mounting the seat in different positions in relation to the rigged frame holding the two wheel axles. The tilt of the seat is adjusted by further displacing the two bearing arms arranged in each rigged side frame such that the tilting of the seat cannot be carried out stepless or while a person is seated in the chair. Furthermore, transfer of the point of gravity in relation to the driving direction is not possible since the distance between the wheels is fixed whereby the chair has a firm wheel base.

SUMMARY OF THE INVENTION

It is the object of this invention to provide a wheelchair which can be accommodated to the change in the size of the user without the above-mentioned problems. This object is achieved by a wheelchair comprising a seat, a back support, and a number of wheels wherein that said wheelchair comprising means for adjusting the width of the seat means for adjusting the width of the back support and means for adjusting the width of the track of the wheels.

These characteristics are particularly interesting with respect to wheelchairs for children, which by nature change size continuously. By having a wheelchair according to the present invention, one wheelchair is able to grow with the user, which provides the user with extra comfort as he/she does not have to get used to a new wheelchair. Furthermore, from an economic point of view, it is cheaper to modify an existing chair then repeatedly to purchase a new chair.

The wheelchair according to the present invention can be accommodated to a person changing size or to persons having various sizes. The user is provided with a comfortable seat and a wheelchair which does not have an unnecessary big width of the track of the wheels and do not extend unnecessarily in the forward direction. Because the width of the track of the wheels can be adapted to the user the wheelchair is easy to manoeuvre. Furthermore, it is easy to pull up to tables and desks because of the reduced forward extension.

In a further advantageous embodiment of the invention the means for adjusting the width of the track of the wheels comprises a frame comprising a pair of back apertures, a pair of front apertures, and a central front aperture, each back aperture is adapted for receiving a variable length of a back spacer, each front aperture is adapted for receiving a variable length of a front spacer, said back spacer connected to a displacer connected to a back wheel, said displacer comprising an oval aperture adapted for interlocking a leg member, said leg member being connected to said front spacer, said leg member being connected to a front wheel, said central front aperture being an oval aperture adapted for interlocking a central leg member being connected to a wheel.

The frame is the central component of the wheelchair's substructure. By providing the apertures, it is possible to arrange the wheels in the apertures such that this arrangement may be constructed in an adjustable manner.

The frame constituting the central part of the substructure of the wheelchair basically has a substantially triangular shape. The pointed end of the triangle is pointing forwards and the base of the triangle is pointing backwards. By providing the apertures in the frame such that the apertures are open in a direction perpendicular to the driving direction, it is possible to insert the back spacers inside the apertures in order to provide the width adjustment for the wheelchair. The back spacers thereby constitute the connection member between the frame and the wheel structure. By being able to insert the back spacer into the apertures provided in the frame more or less that is to say that the back spaces extends more or less out from the frame, it is possible to vary the overall width of the construction whereby it becomes possible to accommodate different size users.

The wheel construction comprises for example the back wheel which by means of a displacer connects the axle of the back wheel to the back spacer. The displacer is hereby a connection member such that the elevation of the frame may be altered by using different size displacers. The displacers are generally arranged vertically in relation to the ground such that the distance from the frame to the wheels axles may be varied.

In the front end of the frame three apertures are also provided namely a pair of apertures having openings perpendicular to the intended travelling direction as well as an aperture opening in the front travelling direction. The pair of apertures opening up in a direction perpendicular to the travelling direction may accommodate a pair of front spacers. The front spacers are used when the wheelchair is used in its four-wheel configuration. In this configuration, a leg member in either side of the frame is arranged adjacent the back apertures and extending forwards. From the two apertures arranged in the front end of the spacer, there are front spacers engaging the leg members in order to stabilise these and transfer the load to the central frame. The leg members are in this manner fastened in apertures adjacent the two back apertures in the frame where means are provided for interlocking the leg members to the frame. Furthermore, in the front end of each leg member, a front wheel is provided.

The front aperture is used in the three-wheel configuration of the wheelchair according to the invention. In this configuration, the leg members and front spacers as described above are replaced by a single central leg member extending from the frame member and forwards in the driving direction. At a distal end of the central leg member, a front wheel is arranged.

In this manner, it is possible due to the central frame member comprising the five apertures as described above to be able to configure the wheelchair both in the traditional four wheel configuration but also in a more easily manoeuvrable three wheel configuration.

The interlocking used for locking the leg members as well as the spacers, both the back spacers and the front spacers are such that a variable length of these spacers may be inserted through the apertures and into the frame such that the wheel base in the distance between the front and the back wheels, the distance between the single front wheel and the back wheel may be varied according to the needs of the user.

The central frame thereby makes it possible for a user to both configure the wheelchair in the three or four wheel configuration and/or also the size of the wheelchair altogether such that it may fit to a person through a growth period or may be adapted to fit different size persons.

Advantageously, the apertures for receiving the leg members may be made as oval apertures as the leg members also advantageously may be made as members having an oval cross-section. The moment of inertia is larger for such profiles such that it is possible to optimize the design and make a lighter construction by using the material characteristics in combination with providing a lightweight design and in this manner take advantage of the bigger moment of inertia due to a longer size in comparison to the smaller size of the rectangular or oval cross-section.

The means for interlocking the leg members and/or fixing the spacers both the back and front spacers in the frame and thereby the overall size of the wheelchair may be made in any suitable way, but in one advantageous embodiment, a slit is provided in the frame parallel to the insertion direction of the spacers. By furthermore providing one or more bolts such that by tightening the bolts, the size of the slit is decreased whereby the frame will grip around the inserted spacer, a complete readjustment possibility is provided. Furthermore, by providing simple means as bolts, spare parts may easily be obtained and furthermore, an easy-to-understand adjustment mechanism is provided.

The wheelchair according to this embodiment of the invention provides a way of easily changing the width of the track of the wheels of the wheelchair. Because the width of the track of the back wheels relates to the length of the back spacer and the width of the track of the front wheels relates to the length of the front spacer the width of the track of the wheels can be easily changed by changing the length of the spacers or changing the amount of the length of the spacers received by the front and back apertures.

In another embodiment of the invention, the spacers, i.e. both the back spacers and the front spacers, are arranged in the apertures in such a way that a clamping collar is arranged, preferably integral with the apertures. In this manner the track width between the wheels, whether it be the front or rear wheels, can be adjusted continuously such that any track width can be selected. The clamping collar integral with the apertures can for example be shaped by providing a slit in the aperture parallel to the insertion direction of the back spacers. Across the slit bolts can be inserted such that by tightening the bolts, the material on either side of the slit will be forced together and thereby clamp and lock the back spacer into firm engagement and thereby prevent sliding of the back spacer in the aperture.

Furthermore, this embodiment provides the opportunity for using the same wheelchair in two very different setups. When each back aperture and front aperture are connected to a leg member the wheelchair is set up with four wheels and provides a very stable and classic look of the chair. When only the central front aperture is interlocking a central leg member connected to a wheel, the wheelchair is provided with three wheels. This three wheel setup provides a more sporty and easily manoeuvrable wheelchair. By providing the wheelchair with different length of leg members the length as well as the height of the wheelchair can be easily changed.

In a still further advantageous embodiment of the invention the means for adjusting the width of the seat comprises two support members slidingly arranged in a seat plate. By providing slidingly arranged support members the seat is fully adjustable and can be accommodated to the actual size of the user. It is advantageous that there is at least one support member on each side of the seat, and the seat can be supported by several slidingly arranged support members.

In a further advantageous embodiment of the invention the wheelchair comprises at least one foot rest attached to said wheelchair with releasable attachment means, said releasable attachment means comprising a hook-shaped member pivotally secured to said wheelchair for engagement with a hook-shaped member on said foot rest. Some users only occasionally need foot rests. It is therefore advantageous that the foot rest can be easily removed from the wheelchair and be easily re-connected to the wheelchair. Furthermore, the releasable attachment means of this embodiment of the invention provides a strong and stable attachment of the foot rest to the wheelchair.

In the embodiment of the invention where two front wheels are provided, the front single aperture can be used in order to insert a second type of foot rest. By inserting for example a pipe member into the aperture and locking it as disclosed above, this pipe member will have a very firm engagement with the wheelchair. Plate-shaped foot rests having articulated connection to a beam member which again is articulately connected to the pipe member thereby provide for a multitude of adjustment possibilities in order to accommodate the user of the wheelchair. By further providing different fastening possibilities along the length of the pipe member, the foot rest can be adjusted to different leg lengths or differences in leg lengths of the individual user. The fastening means can for example be in the shape of a bolt going trough a connection hub arranged at the opposite end of the foot plate member in the beam member. The bolt member can go straight through the pipe member and be tightened by a nut on the opposite side. In this manner a very simple but efficient assembly is provided.

In a still further advantageous embodiment of the invention the means for adjusting the width of the back support comprises a back frame comprising at least one track or aperture, a bracket comprising at least one aperture, at least one of the apertures and tracks respectively being elongated, at least one fastener penetrating at least one aperture of the back frame and one aperture of the bracket, said fastener securing the back frame to the bracket. The width of the back support can be easily changed by loosening the fasteners. When the correct width of the back support is reached the fasteners can be fastened again. Furthermore, a back frame with a totally different width can be used if the width of the back support has to be changed to a very different size.

In a further advantageous embodiment of the invention, the wheelchair further comprises means for tilting the seat and for maintaining an essential constant centre of gravity, said means comprising lockable adjustment means, a first and a second hinge member, both hinge members pivotally connected to said frame, and pivotally connected to said seat, seat adjustment means pivotally connected to said first hinge member and to said seat, said adjustment means comprises locking means.

The lockable adjustment means may be chosen from a blocking gas damper, an electrical actuator, a rack and a pinion electrically operated by means of a step motor, a spindle axle, or any other similar means.

It is advantageous that the seat can be tilted, since the users can have different preferences about how they want the seat to be tilted for maximum comfort. If the front leg members are changed it will often tilt the whole wheelchair, and the seat can be tilted to achieve the optimal alignment. To achieve maximum stability of the wheelchair it is important that the centre of gravity of the user is between the front and back wheels. It is therefore advantageous that the centre of gravity of the seat does not change when the seat is tilted.

The geometric construction of this embodiment of the wheelchair ensures that the centre of gravity is essentially constant when the seat is tilted. The gas damper provides a smooth operation of the tilting of the seat and maintains the tilting in its correct position, when the gas damper is blocked.

In a still further embodiment of the invention the seat is slidingly connected to said frame. Since the seat is slidingly connected to the frame, the position of the user between the front wheels and the back wheels can be adjusted.

BRIEF DESCRIPTION OF THE DRAWINGS

The invention will now be described in more details, with references to the drawing, where.

DETAILED DESCRIPTION OF THE PREFERRED EMBODIMENTS

Figure 1:
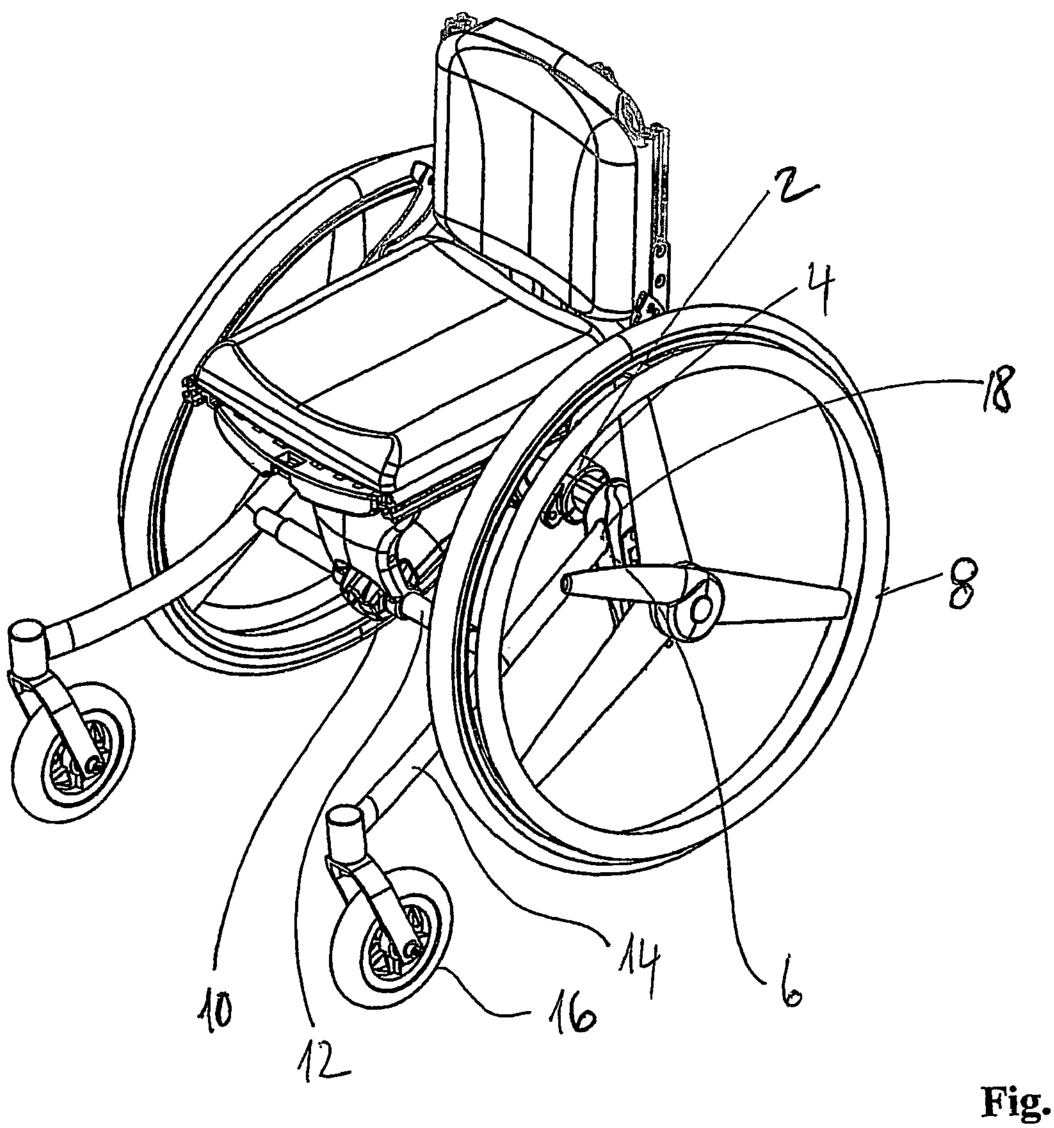
FIG. 1 is a wheelchair according to the invention in a four wheel setup in a perspective view.

With reference to FIG. 1 a wheelchair is built upon a frame 2, the frame comprises at least two back apertures of which only one 4 can be seen. The back aperture 4 is receiving a spacer 6. The back wheel 8 is connected to the spacer 6. The back spacer 6 comprises several holes of which one is selected to secure the back wheel 1 to the wheelchair. By using different sizes of the back wheel 8 or another hole in the spacer 6 the height of the wheelchair can be changed. The frame further comprises two front apertures, of which only one 10 can be seen. The front aperture 10 is receiving a length of front spacer 12, which is connected to a leg member 14. The leg member is further connected to an aperture 18 of the back spacer 6, and to a front wheel 16. The track with of the wheels can be changed by changing the length of the front and back spacers 12,6 received by the front and back apertures 4,10, respectively. In this embodiment the elongated member of the leg member 14 has an oval cross-section, and the aperture 18 of the back spacer 6 has a corresponding oval shape. The leg member shown in this embodiment of the invention is secured in a stable manner to the wheelchair.

Figure 2:
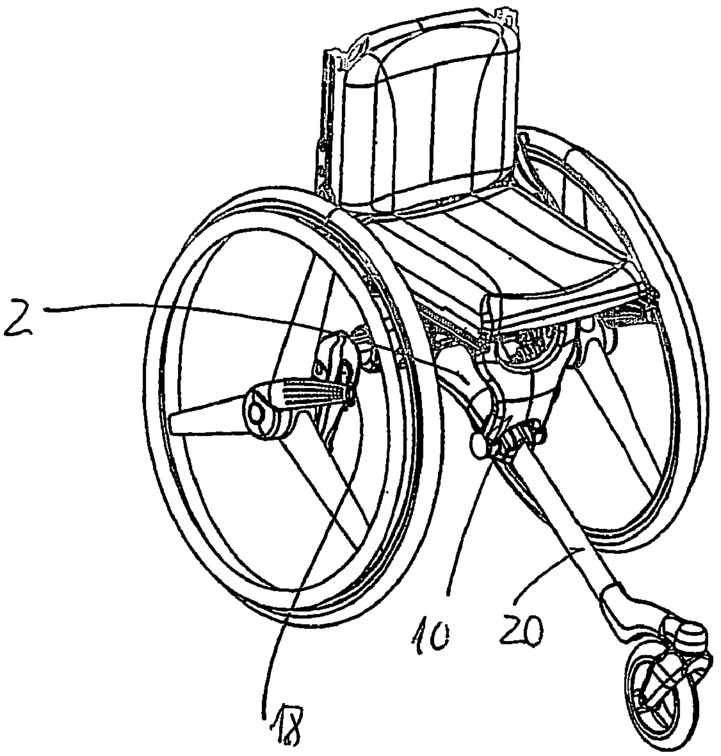
FIG. 2 is a wheelchair according to the invention in a three wheel setup in a perspective view.

In FIG. 2 an embodiment of the wheelchair according to the invention is shown in a three wheel setup. In the three wheel setup a single leg member 20 is received by a central front aperture 22 of the frame 2. In this setup the front apertures 10 and the oval apertures 18 of the back spacers are not used. The chair can easily be changed back and forth between a four wheel setup and a three wheel setup. In the three wheel setup the wheelchair has a more sporty look, and also more sporty properties. It is e.g. easier to turn the wheelchair for the user. The three wheel setup is therefore often adequate for a younger and active user.

Figure 3:
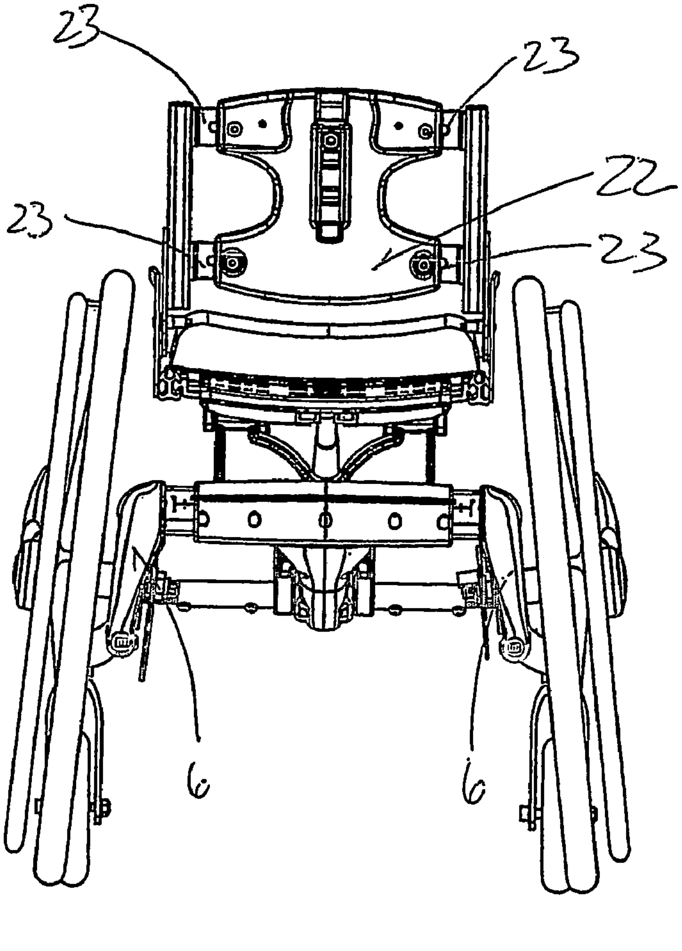
FIG. 3 is an embodiment of the wheel chair as seen from the back side.

In FIG. 3 an embodiment of the wheel chair is seen from the back side. A back frame 22 is connected to a number of brackets 23. The brackets are having elongated holes, and the connection of the back frame 22 to the brackets 23 are made with fasteners penetrating the back frame 22 and the elongated holes of the brackets 23. The width of the back support can then easily be adjusted to a size which fits the user. Of course, the length of the brackets as well as the size of the back frame 22 gives some limits of the possibility for the adjustment of the width of the back support. If necessary, the back frame 22 can be changed to a back frame of completely different size to extend the range of which the back support width can be adjusted.

Figure 4:
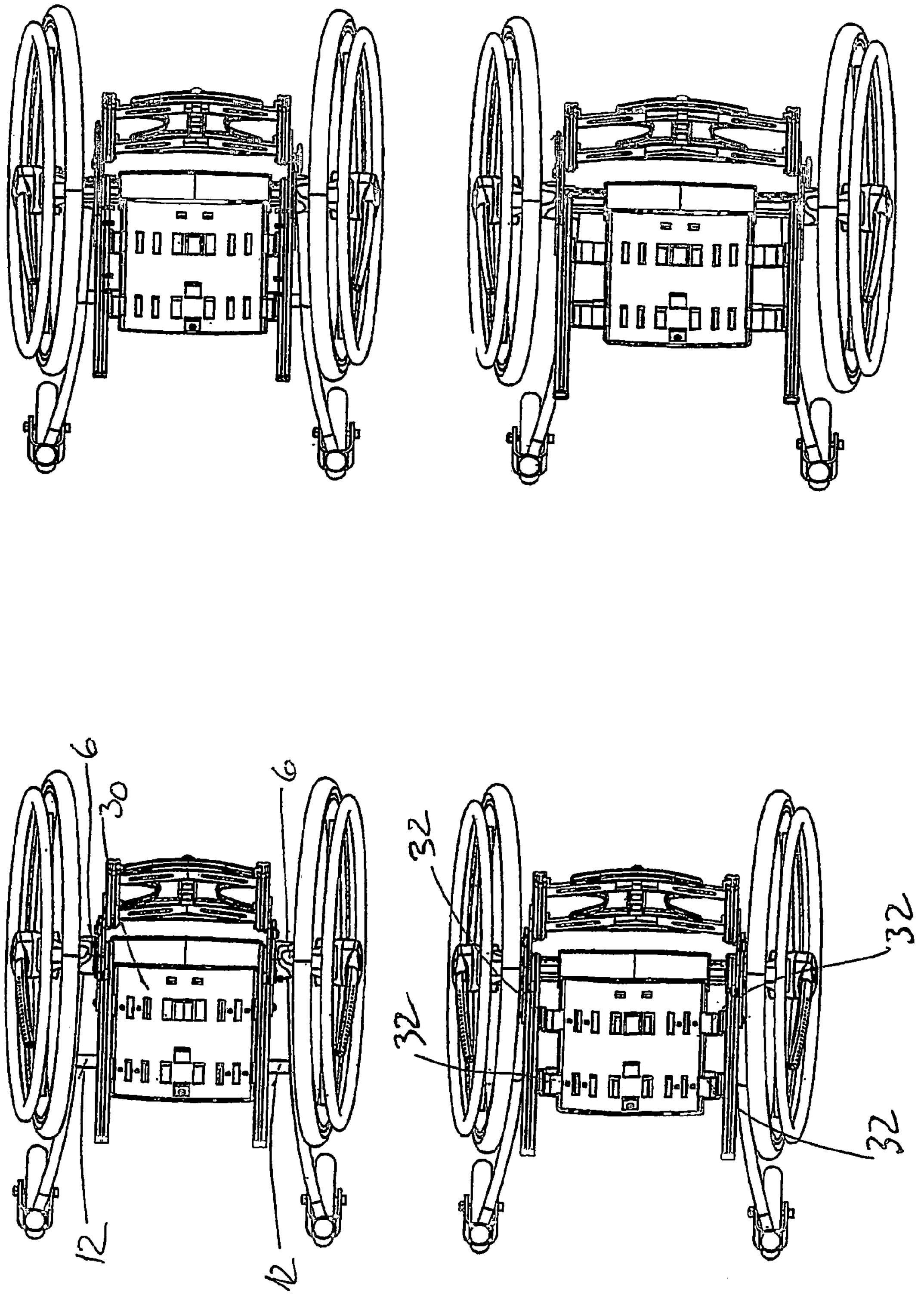
FIG. 4 is a wheelchair shown adjusted with two different widths.

In FIG. 4 the same wheelchair is shown adjusted with two different widths. It can be seen that the bigger width of the wheelchair in FIG. 4*b* compared with FIG. 4*a* is achieved by having a longer length of the back spacers 6 and front spacers 12 outside the front and back apertures than in FIG. 4*b*. Furthermore, the brackets 23 of the back support are moved apart from each other in FIG. 4*b*. The seat 30 is made adjustable in a similar manner. Inside the seat 30 a number of support members 32 are slidingly arranged.

Figure 5:
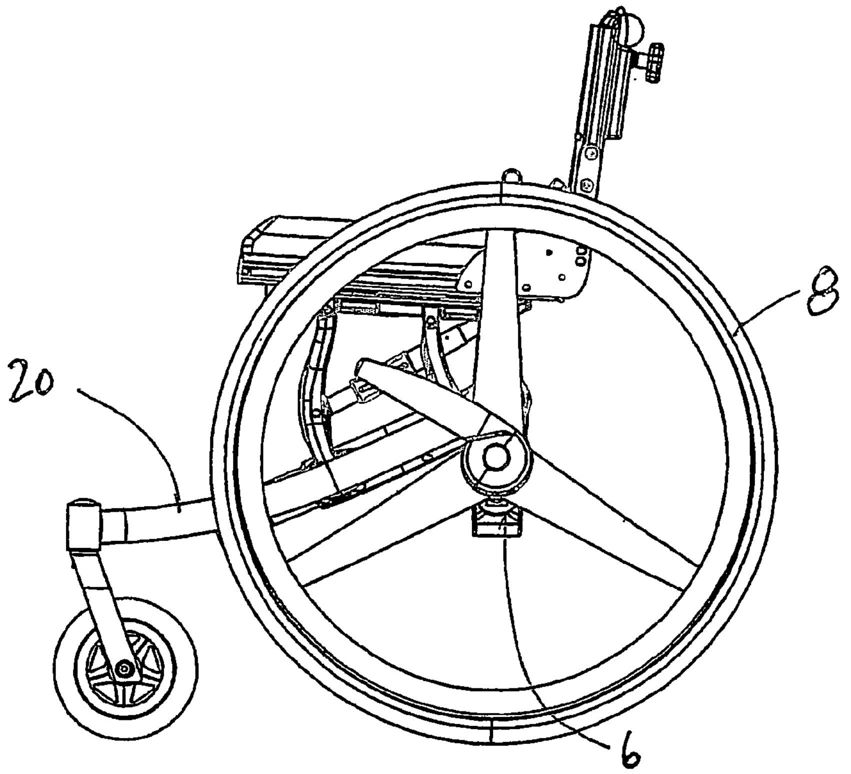
FIGS. 5 and 6 shows a wheelchair adjusted to two different heights.
Figure 6:
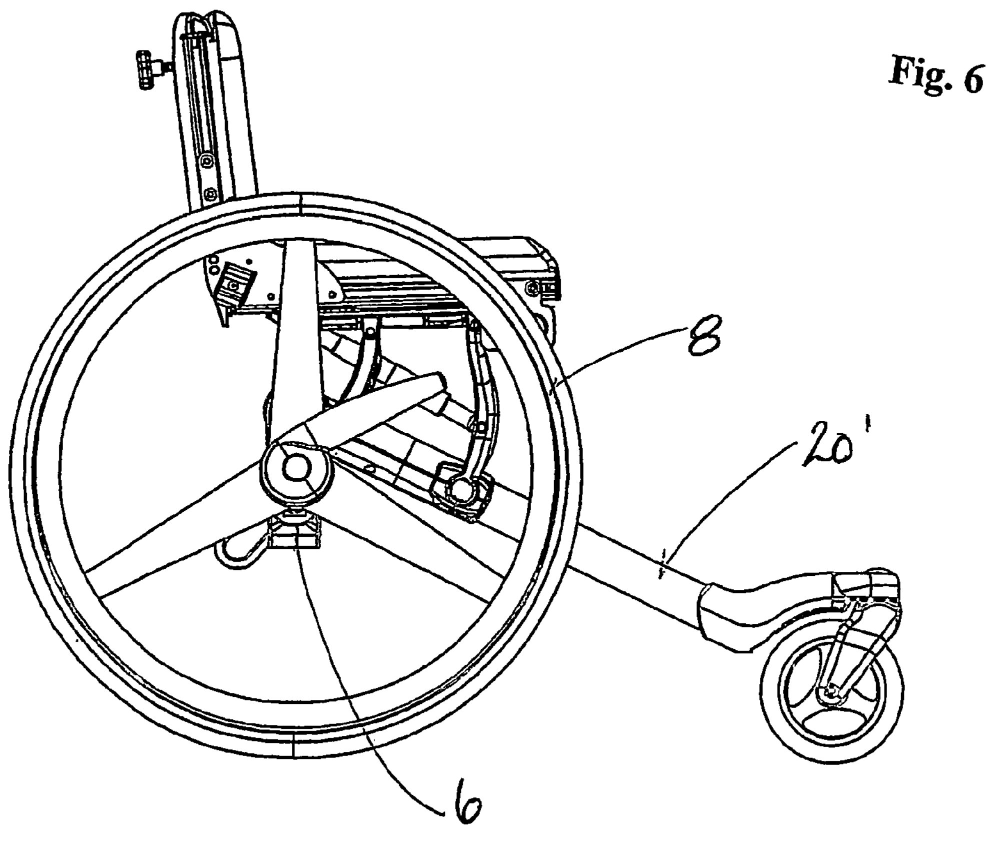

In FIGS. 5 and 6 it is shown how the height and the length of the wheelchair can be changed by using another central leg member 20 and mounting the wheel 8 in another hole of the back spacer 6. The back spacer is provided with several holes. The height of the seat can be changed by mounting the wheel 8 in a lower hole of the back spacer 6. It is also possible to make the wheelchair longer by changing the central leg member 20 to a longer type of the same central leg member 20'. The same effect can be obtained in the four wheel setup by changing the to front leg members.

Figure 7:
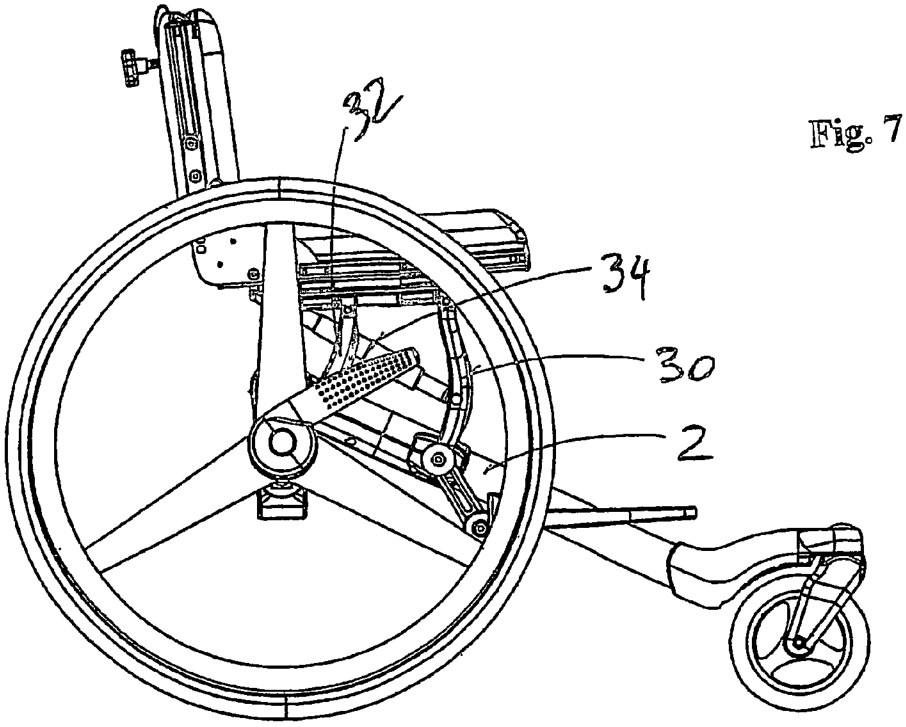
FIGS. 7 and 8 show a wheelchair with the seat tilted in two different angels.
Figure 8:
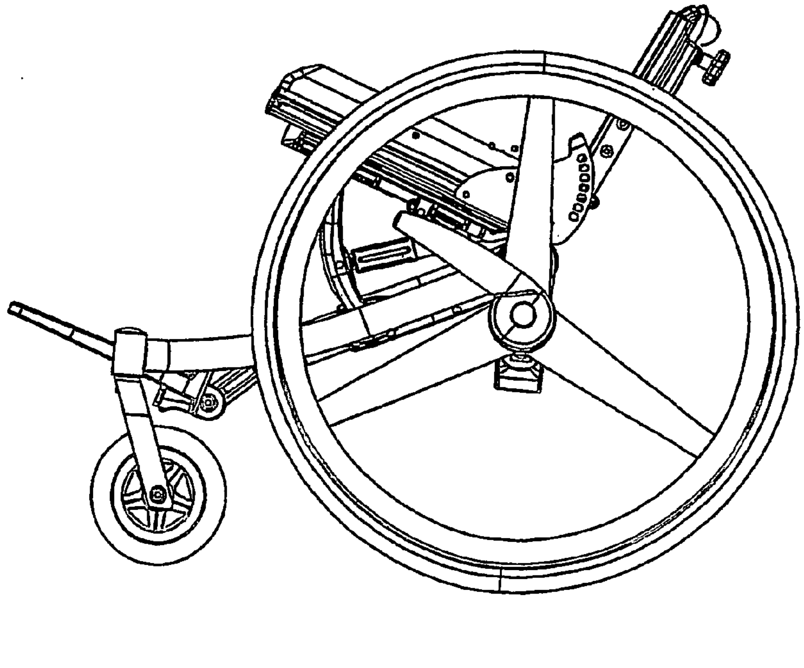

In FIGS. 7 and 8 it is shown how the seat can be tilted in space. The means for tilting the seat of this invention is especially advantageous because they maintain the centre of gravity between the front and back wheels. The means for tilting the seat comprises a hinge construction. The hinge is constructed by a first hinge member 30, which is pivotally connected to the seat and pivotally connected to the frame 2. The hinge construction further comprises a second hinge member 32, which is pivotally connected to the frame 2 and pivotally connected to the seat. A gas damper 34 is pivotally connected to the first hinge member 30 and to the seat. The gas damper 34 is a blocking gas damper, which means that it can be released when the tilt of the seat has to be changed and blocked afterwards.

Figure 9:
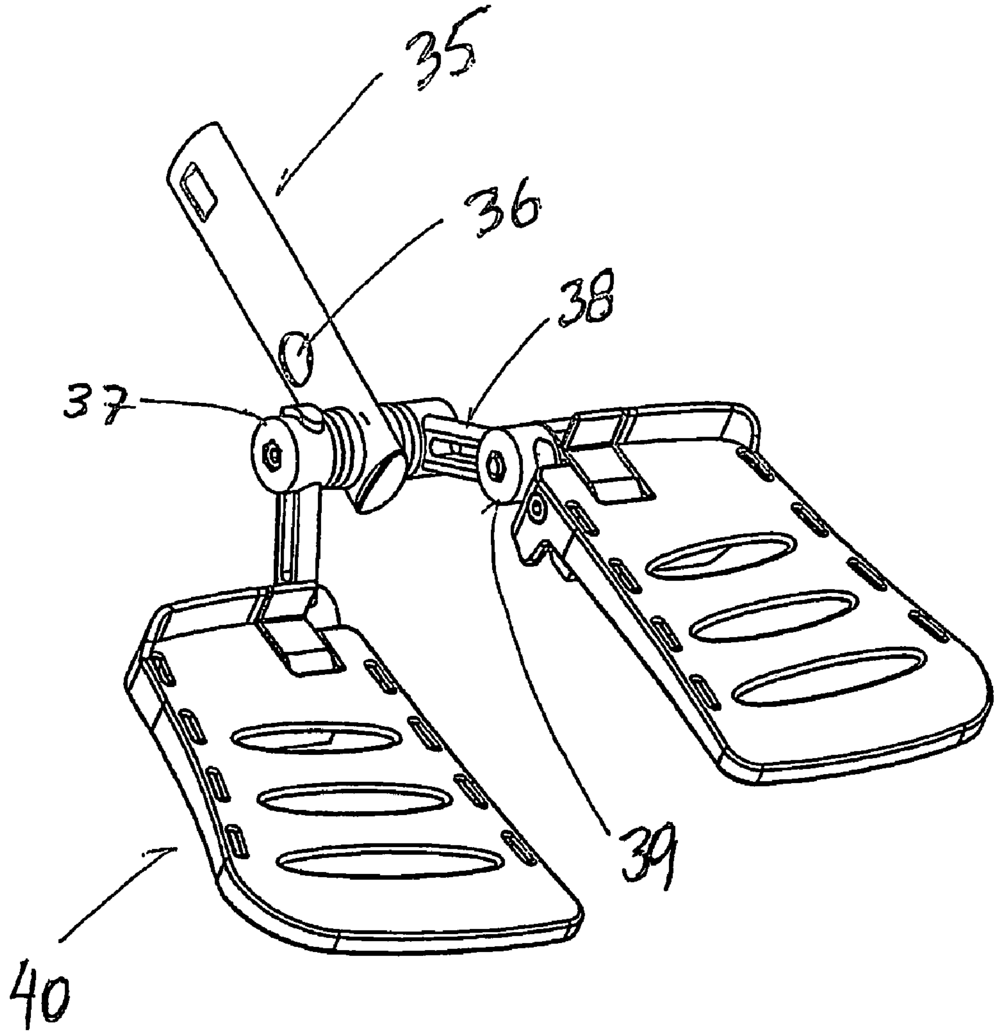
FIG. 9 shows a foot rest assembly.

FIG. 9 illustrates a foot rest arranged at the end of a pipe-shaped member 35. The pipe member 35 can for example be attached to the frame in the same manner as the front wheel 20 (see FIGS. 5 and 6). In the pipe member 35 means 36 for fastening a hub member 37 are arranged. The hub member 37 is fastened by for example a bolt (not shown) going through the hub member and through a hole 36 in the pipe member 35. In this manner, the hub can very easily and securely be fastened to the pipe member 35. The hub member is articulately connected to a beam member 38 which again, though a pivot point 39 is connected to the actual plate-shaped foot rests 40. Both in the pivot 39 and the hub member 37, means are provided such that the beam member 38 can be locked in an angle relative to the pipe member 35, and the plate-shaped foot rests 40 can be locked in an angular relationship with the beam member 38 such that any desired position of foot rests can be attained. In this manner, a very flexible and comfortable foot rest is provided. Furthermore, the two foot rests can be arranged in different means 36 along the pipe 35 such that differences in leg lengths or foot rest comfort positions can be accommodated.

The invention claimed is:

1. A wheelchair comprising a seat, a back support and a number of wheels, provided with means for adjusting the width of the seat, means for adjusting the width of the back support and means for adjusting the width of the track of the wheels, and further that said means for adjusting the width of the track of the wheels comprises a frame comprising a pair of back apertures, a pair of front apertures, and a central front aperture, where each of the back apertures are adapted for receiving a variable length of a back spacer, each front aperture adapted for receiving a variable length of a front spacer, said back spacer connected to a displacer connected to a back wheel, said displacer comprising an aperture adapted for interlocking a leg member, said leg member being connected to said front spacer, said leg member being connected to a front wheel, said central front aperture being an aperture adapted to interlock a central leg member being connected to a wheel, and where said means for adjusting the width of the seat comprises two support members slidingly arranged in a seat plate.

2. A wheelchair according to claim 1, comprising at least one foot rest attached to said wheelchair with releasable attachment means, said releasable attachment means comprising a hook shaped member pivotally secured to said wheelchair, for engagement with a hook shaped member of said foot rest.

3. A wheelchair according to claim 1, where said means for adjusting the width of the back support comprises a back frame comprising at least one track or aperture, a bracket comprising at least one aperture, at least one of the apertures and tracks respectively being elongated, at least one fastener penetrating at least one aperture of the back frame and one aperture of the bracket, said fastener securing the back frame to the bracket.

4. A wheelchair according to claim 1, comprising means for tilting the seat and for maintaining an essentially constant centre of gravity, said means comprising a lockable adjustment means, a first and a second hinge member, both hinge member pivotally connected to said frame and pivotally connected to said seat, said adjustment means pivotally connected to said first hinge member and to said seat, said adjustment means comprising blocking means.

5. A wheelchair according to claim 4, wherein the lockable adjustment means may be chosen from a blocking gas damper, an electrical actuator, a rack and pinion electrically operated by means of a step motor, a spindle axle, or any other similar means.

6. A wheelchair according to claim 1, where said seat is slidingly connected to said frame.

* * * * *